(12) United States Patent
Tan et al.

(10) Patent No.: US 8,130,330 B2
(45) Date of Patent: Mar. 6, 2012

(54) IMMERSIVE SURROUND VISUAL FIELDS

(75) Inventors: Kar-Han Tan, Palo Alto, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 1470 days.

(21) Appl. No.: 11/294,023

(22) Filed: Dec. 5, 2005

(65) Prior Publication Data
US 2007/0126938 A1   Jun. 7, 2007

(51) Int. Cl.
*H04N 5/64* (2006.01)
(52) U.S. Cl. ........ 348/840; 348/585; 348/590; 348/722; 345/629
(58) Field of Classification Search .......... 348/840, 348/794; 345/629
See application file for complete search history.

(56) References Cited

U.S. PATENT DOCUMENTS

| | | | |
|---|---|---|---|
| 3,740,469 A * | 6/1973 | Herndon | 348/36 |
| 4,656,506 A | 4/1987 | Ritchey | |
| 4,868,682 A | 9/1989 | Shimizu et al. | |
| 5,250,888 A * | 10/1993 | Yu | 318/640 |
| 5,262,856 A | 11/1993 | Lippman et al. | |
| 5,557,684 A | 9/1996 | Wang et al. | |
| 5,687,258 A | 11/1997 | Kaplan | |
| 5,850,352 A | 12/1998 | Moezzi et al. | |
| 5,926,153 A | 7/1999 | Ohishi et al. | |
| 5,927,985 A | 7/1999 | Lechner | |
| 5,963,247 A * | 10/1999 | Banitt | 348/121 |
| 6,037,988 A * | 3/2000 | Gu et al. | 375/240.16 |
| 6,297,814 B1 | 10/2001 | Masuda et al. | |
| 6,327,020 B1 | 12/2001 | Iwata | |
| 6,445,365 B1 | 9/2002 | Taniguchi et al. | |
| 6,483,511 B1 * | 11/2002 | Snyder | 345/473 |
| 6,549,659 B1 * | 4/2003 | Welch et al. | 382/203 |
| 6,567,086 B1 | 5/2003 | Hashimoto | |
| 6,611,266 B1 * | 8/2003 | Pollack et al. | 345/427 |
| 6,611,297 B1 * | 8/2003 | Akashi et al. | 348/739 |
| 6,712,477 B2 | 3/2004 | Idaszak et al. | |
| 6,747,647 B2 | 6/2004 | Youngblood et al. | |
| 6,778,211 B1 | 8/2004 | Zimmermann et al. | |

(Continued)

FOREIGN PATENT DOCUMENTS

JP   08-016141   1/1996

(Continued)

OTHER PUBLICATIONS

Black, Michael J., et al., "The Robust Estimation of Multiple Motions: Parametric and Piecewise-Smooth Flow Fields", Computer Vision and Image Understanding, vol. 63, No. 1, Article No. 0006, pp. 75-104.

(Continued)

*Primary Examiner* — Jason Chan
*Assistant Examiner* — Cynthia Calderon

(57) ABSTRACT

A surround visual field that has a characteristic or characteristics that relate to an audio/visual presentation is described. In one embodiment, the surround visual field is projected on an area partially surrounding or surrounding video content being displayed on a device. This surround visual field may be comprised of a plurality of elements that further enhance the visual effect of the content being displayed. For example, one embodiment of the invention provides for elements within the surround visual field to move in relation to motion within the video content being displayed. Other characteristics of the video content may also be supplemented by the surround visual field or the surround visual field may simply be authored to correspond to the content itself.

19 Claims, 15 Drawing Sheets

1030

U.S. PATENT DOCUMENTS

| | | | |
|---|---|---|---|
| 6,778,226 B1* | 8/2004 | Eshelman et al. | 348/836 |
| 6,919,909 B1* | 7/2005 | Spletzer et al. | 345/632 |
| 7,053,915 B1* | 5/2006 | Jung et al. | 345/633 |
| 7,408,986 B2* | 8/2008 | Winder | 375/240.12 |
| 7,447,337 B2* | 11/2008 | Zhang et al. | 382/107 |
| 7,576,727 B2 | 8/2009 | Bell | |
| 2002/0063709 A1 | 5/2002 | Gilbert et al. | |
| 2002/0135738 A1* | 9/2002 | Cok et al. | 353/7 |
| 2002/0167531 A1 | 11/2002 | Baudisch | |
| 2003/0090506 A1 | 5/2003 | Moore et al. | |
| 2003/0128187 A1* | 7/2003 | Strubbe | 345/157 |
| 2004/0119725 A1 | 6/2004 | Li | |
| 2004/0183775 A1 | 9/2004 | Bell | |
| 2004/0207735 A1 | 10/2004 | Kameyama et al. | |
| 2005/0024488 A1 | 2/2005 | Borg | |
| 2005/0275626 A1 | 12/2005 | Mueller et al. | |
| 2006/0262188 A1 | 11/2006 | Elyada et al. | |
| 2006/0268363 A1* | 11/2006 | Meinders | 358/453 |
| 2007/0141545 A1* | 6/2007 | Tan et al. | 434/365 |
| 2007/0174010 A1* | 7/2007 | Bhat et al. | 702/66 |
| 2007/0296721 A1* | 12/2007 | Chang et al. | 345/427 |
| 2008/0018792 A1* | 1/2008 | Bhat et al. | 348/578 |
| 2008/0062123 A1 | 3/2008 | Bell | |
| 2008/0175439 A1* | 7/2008 | Kurata | 382/107 |
| 2010/0119171 A1* | 5/2010 | Gobert | 382/255 |

FOREIGN PATENT DOCUMENTS

JP      2005-303493      10/2005

OTHER PUBLICATIONS

Burt, Peter J., et al., "The Laplacian Pyramid as a Compact Image Code", *IEEE* Transactions on Communications, vol.com-31, No. 4, Apr. 1983, pp. 532-540.

Lucas, Bruce D., et al., "An Iterative Image Registration Technique with an Application to Stereo Vision", Proceedings $7^{th}$ Intl. Joint Conf. On Artificial Intelligence (IJCAI) Aug. 24-28, 1981, pp. 674-679.

Wang, John Y.A., et al., "Layered Representation for Motion Analysis", Proc.. of the *IEEE* Computer Vision and Pattern Recognition Conference, Jun. 1993, pp. 361-366.

Johanson, C, "Real-time water rendering", Master of Science Thesis, Lund University, Mar. 2004.

Efros, A., et al., "Image Quilting for Texture Synthesis and Transfer", Proceedings of ACM SIGGRAPH 2001, Computer Graphics Proceedings, Annual Conference Series, Aug. 2001, pp. 341-346.

Perlin, K., et al., "Hypertexture", Computer Graphics (Proceedings of SIGGRAPH 1989), vol. 23, Jul. 1989, pp. 253-262.

Perlin, K., "An Image Synthesizer", Computer Graphics (Proceedings of SIGGRAPH 1985), vol. 19, Jul. 1985, pp. 287-296.

Foster, N., et al., "Practical Animation of Liquids", Proceedings of ACM SIGGRAPH 2001, Computer Graphics Proceedings, Annual Conference Series, Aug. 30, 2001, pp. 1-8.

Phillips, Philips Consumer Electronics News Center, "Phillips introduces Active Ambilight ambient lighting technology", http://www.press.ce.philips.com, Sep. 7, 2004.

Kwatra, V., et al., "Texture Optimization for Example-based Synthesis", Proceedings of ACM SIGGRAPH, 2005.

Kwatra, V., et al., "Graphcut Textures: Image and Video Synthesis Using Graph Cuts", ACM Transactions on Graphics, 22(3): 277-286, Jul. 2003.

Phillips, Phillips Consumer Electronics News Center, "Phillips introduces Active Ambilight ambient lighting technology", www.press.ce.philips.com, Sep. 2004.

* cited by examiner

1010

1030

IMMERSIVE SURROUND VISUAL FIELDS

BACKGROUND

A. Technical Field

The present invention relates generally to the visual enhancement of an audio/video presentation, and more particularly, to the synthesis and display of a surround visual field relating to the audio/visual presentation.

B. Background of the Invention

Various technological advancements in the audio/visual entertainment industry have greatly enhanced the experience of an individual viewing or listening to media content. A number of these technological advancements improved the quality of video being displayed on devices such as televisions, movie theatre systems, computers, portable video devices, and other such electronic devices. Other advancements improved the quality of audio provided to an individual during the display of media content. These advancements in audio/visual presentation technology were intended to improve the enjoyment of an individual viewing this media content.

An important ingredient in the presentation of media content is facilitating the immersion of an individual into the presentation being viewed. A media presentation is oftentimes more engaging if an individual feels a part of a scene or feels as if the content is being viewed "live". Such a dynamic presentation tends to more effectively maintain a viewer's suspension of disbelief and thus creates a more satisfying experience.

This principle of immersion has already been significantly addressed in regards to an audio component of a media experience. Audio systems, such as Surround Sound, provide audio content to an individual from various sources within a room in order to mimic a real life experience. For example, multiple loudspeakers may be positioned in a room and connected to an audio controller. The audio controller may have a certain speaker produce sound relative to a corresponding video display and the speaker location within the room. This type of audio system is intended to simulate a sound field in which a video scene is being displayed.

Current video display technologies have not been as effective in creating an immersive experience for an individual. Although certain video technologies address immersion with varying degrees of success, current video display devices oftentimes fail to provide a full coverage of the field of view of an individual watching the device. As a result, objects or events within the individual's field of view may distract his/her viewing experience and disrupt the immersive effects of the media content.

Accordingly, what is desired is a system, apparatus and method that address the above-described limitations.

SUMMARY OF THE INVENTION

The present invention provides a surround visual field within an individual's field of view, which relates to audio or visual content being displayed. In one embodiment of the invention, the surround visual field is synthesized and projected on a surface that partially or completely surrounds a device that is displaying the content. This surround visual field is intended to further enhance the viewing experience of the content being displayed. Accordingly, the surround visual field may enhance, extend, or otherwise supplement a characteristic or characteristics of the content being displayed. The surround visual field may relate to numerous characteristics within the content being displayed including, but not limited to, motion, color, intensity, audio, genre, and action.

In one embodiment of the invention, the surround visual field is projected onto a surface during the presentation of audio/video content. The size, location and shape of this projected surround visual field may be defined by an author of the visual field, may relate to the content being displayed, or be otherwise defined. Furthermore, the characteristics of the surround visual field may include various types of shapes, textures, patterns, waves or any other visual effect that may enhance the viewing of content on the display device. One skilled in the art will recognize that various audio/visual or projection systems may be used to generate and control the surround visual field; all of these systems are intended to fall within the scope of the present invention.

In one exemplary embodiment of the invention, the surround visual field may relate to motion within the content being displayed. For example, motion within the content being displayed may be modeled and extrapolated. The surround visual field, or components therein, may move according to the extrapolated motion within the content. Shapes, patterns or any other element within the surround visual field may also have characteristics that further relate to the content's motion or any other characteristic thereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
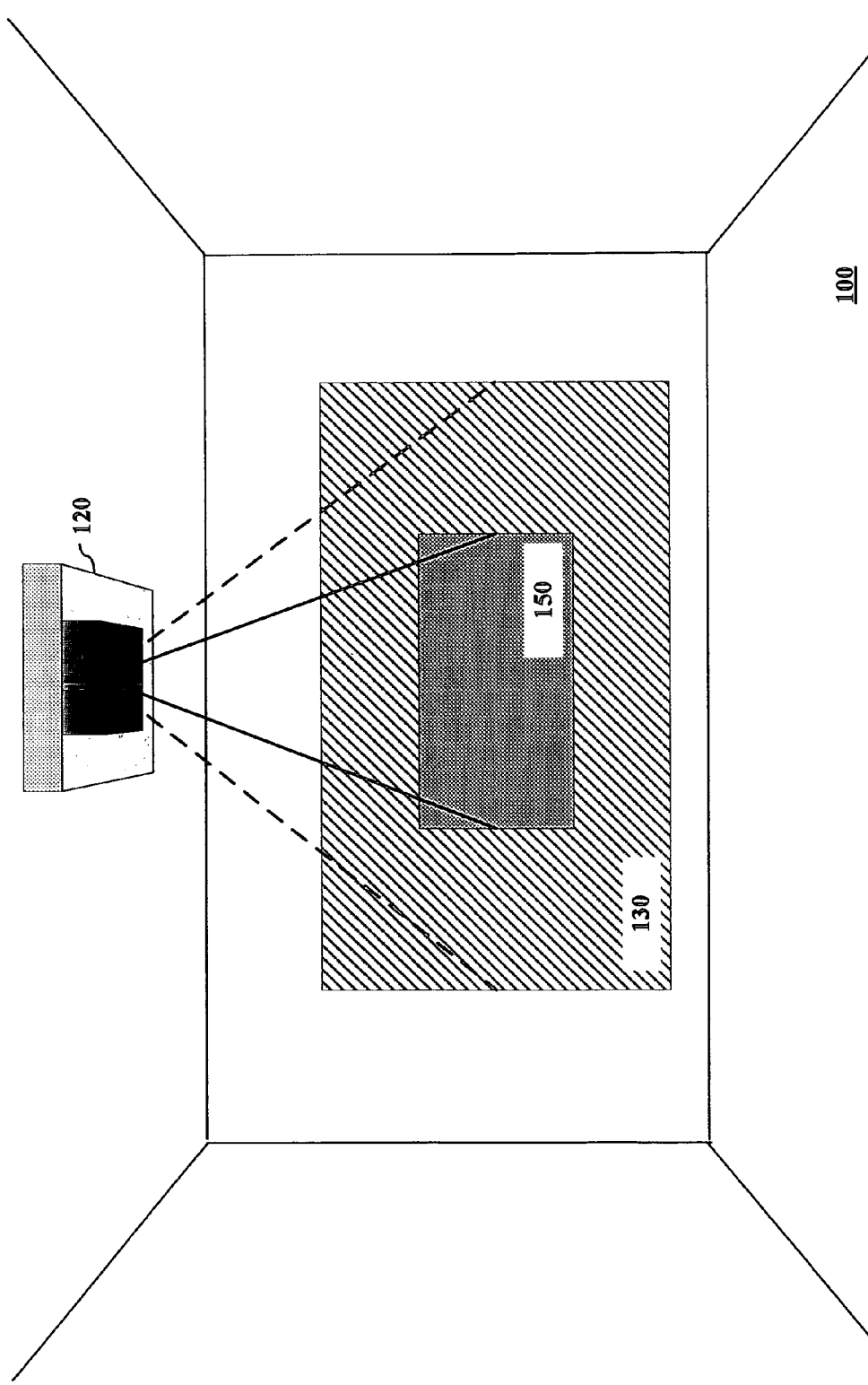
FIG. 1 is an illustration of a surround visual field system including a projector according to one embodiment of the invention.

Systems, devices and methods for providing a surround visual field that may be used in conjunction with an audio/visual display are described. In one embodiment of the invention, a surround visual field is synthesized and projected on a surface during the presentation of the audio/visual content. The surround visual field may comprise various visual effects including, but not limited to, various patterns, colors, shapes, textures, sizes, etc. The surround visual field has a characteristic or characteristics that relate to the audio/visual content and supplement the viewing experience of the content. In one embodiment, elements within the surround visual field, or the surround visual field itself, visually change in relation to the audio/visual content or the environment in which the audio/visual content is being displayed. For example, elements within a surround visual field may move in relation to motion within the video content being displayed.

In another embodiment of the invention, the surround visual field may be authored, and not automatically generated at viewing time, to relate to audio/visual content. For example, the surround visual field may be synchronized to content so that both content and the surround visual field may enhance the viewing experience of the content. One skilled in the art will recognize that the surround visual field and the audio/visual content may be related in numerous ways and visually presented to an individual, all of which fall under the scope of the present invention.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including projection systems, theatre systems, home televisions and system, and other types of audio/visual entertainment systems. The embodiments of the present invention may also be present in software, hardware or firmware. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

C. Overview

FIG. 1 illustrates a surround visual field display system that may be incorporated in a theatre or home video environment according to one embodiment of the invention. The system 100 includes a projector 120 that projects video content within a first area 150 and a surround visual field in a second area 130 surrounding the first area 150. The surround visual field does not necessarily need to be projected around the first area 150; rather, this second area 130 may partially surround the first area 150, be adjacent to the first area 150, or otherwise projected into an individual's field of view.

The projector may be a single conventional projector, a single panoramic projector, multiple mosaiced projectors, a mirrored projector, novel projectors with panoramic projection fields, any hybrid of these types of projectors, or any other type of projector from which a surround visual field may be emitted and controlled. The surround visual field projected into the second area 130 may include various patterns, shapes, colors, and textures, which may include discrete elements of varying size and attributes, and which relate to a characteristic(s) of the audio/video content that is being displayed in the first area 150. These patterns and textures may take the shape of a starfield, fireworks, waves, or any other synthetic pattern or texture.

In one embodiment of the invention, a surround visual field is projected in the second area 130 but not within the first area 150 where the actual video content is being displayed. In another embodiment of the invention, the surround visual field may also be projected into the first area 150 or both the first area 150 and the second area 130. If the surround visual field is projected into the first area 150, certain aspects of the displayed video content may be highlighted, emphasized or otherwise supplemented by the surround visual field. For example, particular motion displayed within the first area 150 may be highlighted by projecting a visual field on the object performing the particular motion within the video content.

In yet another embodiment of the invention, texture synthesis patterns may be generated that effectively extend the content of the video outside of its frame. If quasi-regular patterns are present within a video frame, the projector 120 may project the quasi-regular pattern outside of the first area 150 and into the second area 130. For example, a corn field within a video frame may be expanded outside of the first area 150 by generating a pattern that appears like an extension of the corn field.

Figure 2:
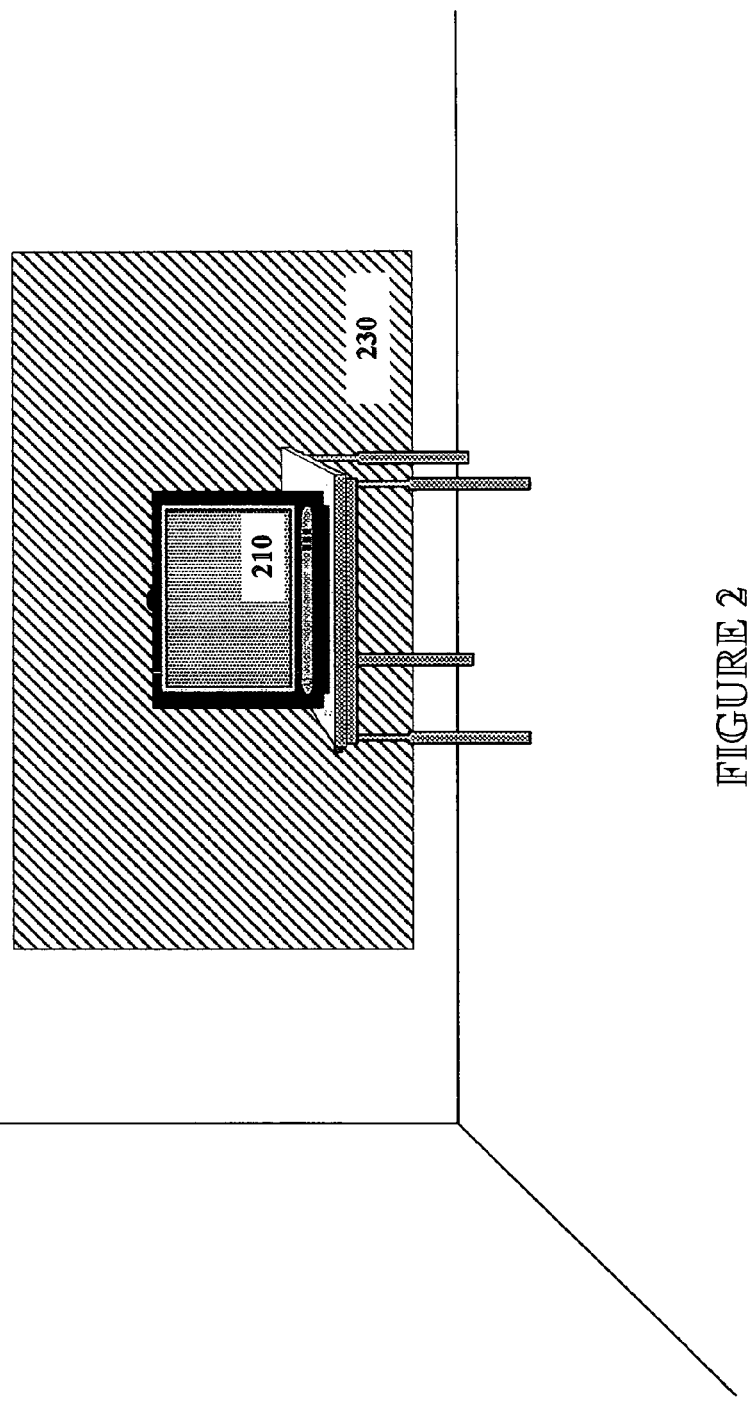
FIG. 2 is an illustration of a television set with surround visual field according to one embodiment of the invention.

FIG. 2 illustrates a surround visual field in relation to a television set according to one embodiment of the invention. A television set having a defined viewing screen 210 is supplemented with a surround visual field projected on a surface 230 of a wall behind the television set. For example, a large television set or perhaps a video wall may be used to display video content. This surface 230 may vary in size and shape and is not limited to just a single wall but may be expanded to cover as much area within the room as desired. Furthermore, the surface 230 does not necessarily need to surround the television set, as illustrated, but may partially surround the television set or be located in various other positions on the wall or walls. As described above, the surround visual field may have various characteristics that relate it to the content displayed on the television screen 210. Various embodiments of the invention may be employed to project the surround visual field onto the surface of the wall or television set, two examples of which are described below.

Figure 3:
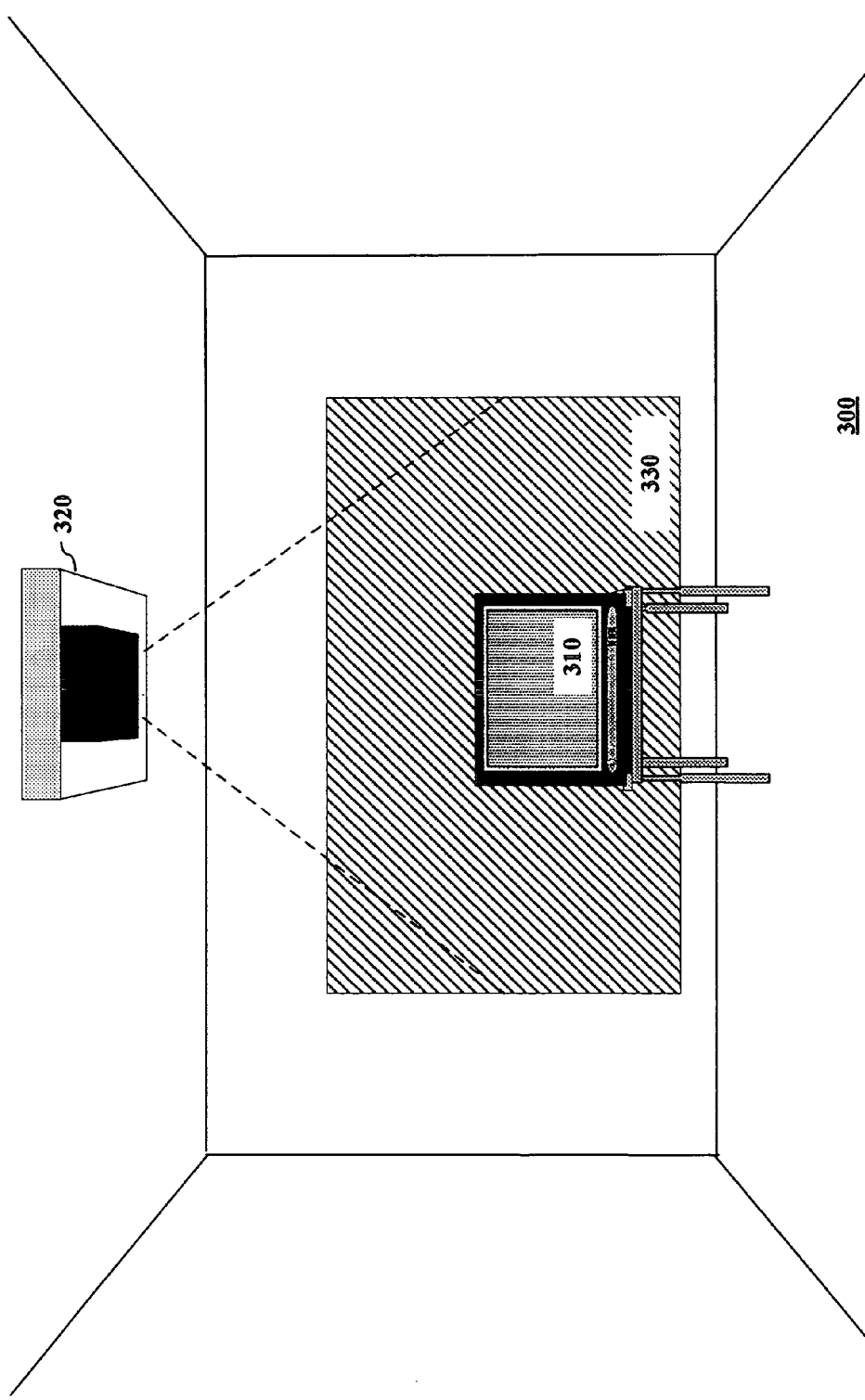
FIG. 3 is an illustration of a television set with surround visual field from a projector according to one embodiment of the invention.

FIG. 3 illustrates one embodiment of the invention in which a surround visual field is projected directly onto an area 330 to supplement content displayed on a television screen 310 or other surface. Although illustrated as being shown on only one wall, the area 330 may extend to multiple walls depending on the type of projector 320 used. The projector 320 is integrated with or connected to a device (not shown) that controls the projected surround visual field. In one embodiment, this device may be provided the video stream that is displayed on the television screen 310. In another embodiment, this device may contain data that was authored to project and synchronize the surround visual field to the content being displayed on the television screen 310. In various embodiments of the invention, the video stream is analyzed, relative to a characteristic(s) of the video, so that the surround visual field may be properly rendered and animated to synchronize to the content displayed on the television screen 310.

In yet another embodiment of the invention, a video display and surround visual field may be shown within the boundaries of a display device such as a television set, computer monitor, etc. In this particular embodiment, there may or may not be a projection device that extends the surround visual field beyond the boundaries of the display device. The surround visual field, shown within the boundaries of the display device, may have various shapes and contain various types of content including patterns, textures, text, varying color, or other content.

Figure 4:
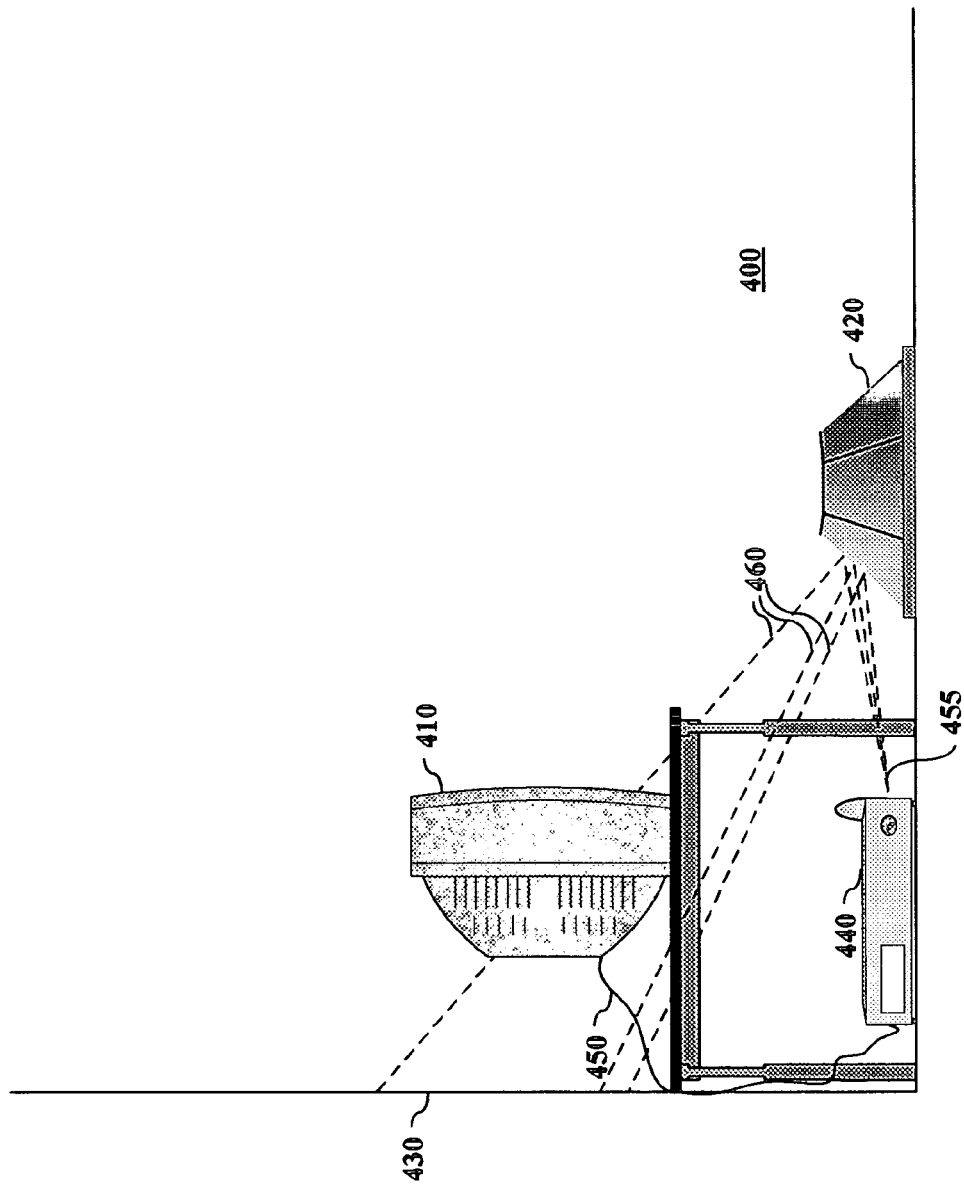
FIG. 4 is an illustration of a television set with surround visual field from a projector and reflective device according to one embodiment of the invention.

FIG. 4 illustrates a reflective system for providing surround visual fields according to another embodiment of the invention. The system 400 may include a single projector or multiple projectors 440 that are used to generate the surround visual field. In one embodiment of the invention, a plurality of light projectors 440 produces a visual field that is reflected off a mirrored pyramid 420 in order to effectively create a virtual projector. The plurality of light projectors 440 may be integrated within the same projector housing or in separate housings. The mirrored pyramid 420 has multiple reflective surfaces that allow light to be reflected from the projector to a preferred area in which the surround visual field is to be displayed. The design of the mirrored pyramid 420 may vary depending on the desired area in which the visual field is to be displayed and the type and number of projectors used within the system. Additionally, other types of reflective devices may also be used within the system to reflect a visual field from a projector onto a desired surface. In another embodiment, a single projector may be used that uses one reflective surface of the mirror pyramid 420, effectively using a planar mirror. The single projector may also project onto multiple faces of the mirror pyramid 420, in which a plurality of virtual optical centers is created.

In one embodiment of the invention, the projector or projectors 440 project a surround visual field that is reflected and projected onto a surface of the wall 430 behind the television 410. As described above, this surround visual field may comprise various shapes, patterns, textures, colors, etc. and may relate to content being displayed on the television 410 in various ways.

One skilled in the art will recognize that various reflective devices and configurations may be used within the system 400 to achieve varying results in the surround visual field.

Furthermore, the projector 440 or projectors may be integrated within the television 410 or furniture holding the television 410.

D. Applications of Surround Visual Fields

Although the above description has described the use of surround visual fields in relation to traditional audio/visual presentation environments such as home television and projection systems and theatre systems, the invention may be applied to numerous other types of environments. Furthermore, the systems used to generate and control the surround visual fields may have additional features that further supplement the basic implementations described above. Below are just a few such examples, and one skilled in the art will recognize that other applications, not described below, will also fall under the scope of the present invention.

(i) Gaming Application

A surround visual field may be created and controlled relative to a characteristic(s) of a video game that is being played by an individual. For example, if a user is moving to the left, previously rendered screen content may be stitched and displayed to the right in the surround area. Other effects, such as shaking of a game controller, may be related to the surround visual field being displayed in order to enhance the experience of shaking. In one embodiment, the surround visual field is synthesized by processing a video stream of the game being played.

(ii) Interactive Surround Visual Fields

A surround visual field may also be controlled interactively by a user viewing a video, listening to music, playing a video game, etc. In one embodiment, a user is able to manually control certain aspects of the surround visual field that are being displayed. In another embodiment, a surround visual field system is able to sense its environment and respond to events within the environment, such as a response to the location of a viewer within a room in which the system is operating.

Viewpoint compensation may also be provided in a surround visual field system. Oftentimes, a viewer is not located in the same position as the virtual center of projection of the surround visual field system. In such an instance, the surround visual field may appear distorted by the three dimensional shape of the room. For example, a uniform pattern may appear denser on one side and sparser on the other side to the viewer caused by mismatch between the projector's virtual center and the location of the viewer. However, if the viewer's location may be sensed, the system may compensate for the mismatch in its projection of the surround visual field. This location may be sensed using various techniques including the use of a sensor (e.g., an infrared LED) located on a television remote control to predict the location of the viewer.

(iii) Sensor Enhanced Displays

Sensors that are positioned on components within the surround visual field system may be used to ensure that proper alignment and calibration between components are maintained, and may allow the system to adapt to its particular environment. For example, in the system illustrated in FIG. 3, it is important for the projector 320 to identify the portion of its projection field in which the television is located. This identification allows the projector 320 to (1) center is surround visual field (within the area 330) around the screen 310 of the television set; (2) prevent the projection, if so desired, of the surround visual field onto the television; and (3) assist in making sure that the surround visual field pattern mosaics seamlessly with the television set display.

In one embodiment, the sensors may be mounted separately from the projection or display optics. In another embodiment, the sensors may be designed to share at least one optical path for the projector or display, possibly using a beam splitter.

In yet another embodiment, certain types of media may incorporate multiple surround video tracks that may be decoded and warped for displaying in the surround visual field display area. One potential form of such media may be embedded sprites or animated visual objects that can be introduced at opportune times within a surround visual field to create optical illusions. For example, an explosion in a displayed video may be extended beyond the boundaries of the television set by having the explosive effects simulated within the surround visual field. In yet another example, a javelin that is thrown may be extended beyond the television screen and its path visualized within the surround visual field. These extensions within the surround visual field may authored by an individual and synchronized to the media content being displayed.

Other implementations, such as telepresence and augmented reality, may also be provided by the present invention. Telepresence creates the illusion that a viewer is transported to a different place using surround visual fields to show imagery captured from a place other than the room. For example, a pattern showing a panoramic view from a beach resort or tropical rainforest may be displayed on a wall. In addition, imagery captured by the visual sensors in various surround visual field system components may be used to produce imagery that mixes real and synthesized objects onto a wall.

E. Surround Visual Field Animation

As described above, the present invention allows the generation and control of a surround visual field in relation to audio/visual content that is being displayed. In one embodiment, the surround visual field may be colorized based on color sampled from a conventional video stream. For example, if a surround visual field system is showing a particular simulation while the video stream has a predominant color that is being displayed, the surround visual field may reflect this predominant color within its field. Elements within the surround visual field may be changed to the predominant color, the surround visual field itself may be changed to the predominant color, or other characteristics of the surround visual field may be used to supplement the color within the video stream. This colorization of the surround visual field may be used to enhance the lighting mood effects that are routinely used in conventional content, e.g., color-filtered sequences, lightning, etc.

In yet another embodiment, the surround visual field system may relate to the audio characteristics of the video stream, such as a Surround Sound audio component. For example, the surround visual field may respond to the intensity of an audio component of the video stream, pitch of the audio component or other audio characteristic. Accordingly, the surround visual field is not limited to relating to just visual content of a video stream, but also audio or other characteristics.

For exemplary purposes, an embodiment in which the motion within video content is used to define movement of elements within the surround visual field is described. One skilled in the art will recognize that various other characteristics of the audio/visual content may be used to generate or control the surround visual field. Furthermore, the surround visual field may be authored by an individual to relate and/or be synchronized to content being displayed.

F. Surround Visual Field Controller Relating to Motion

Figure 5:
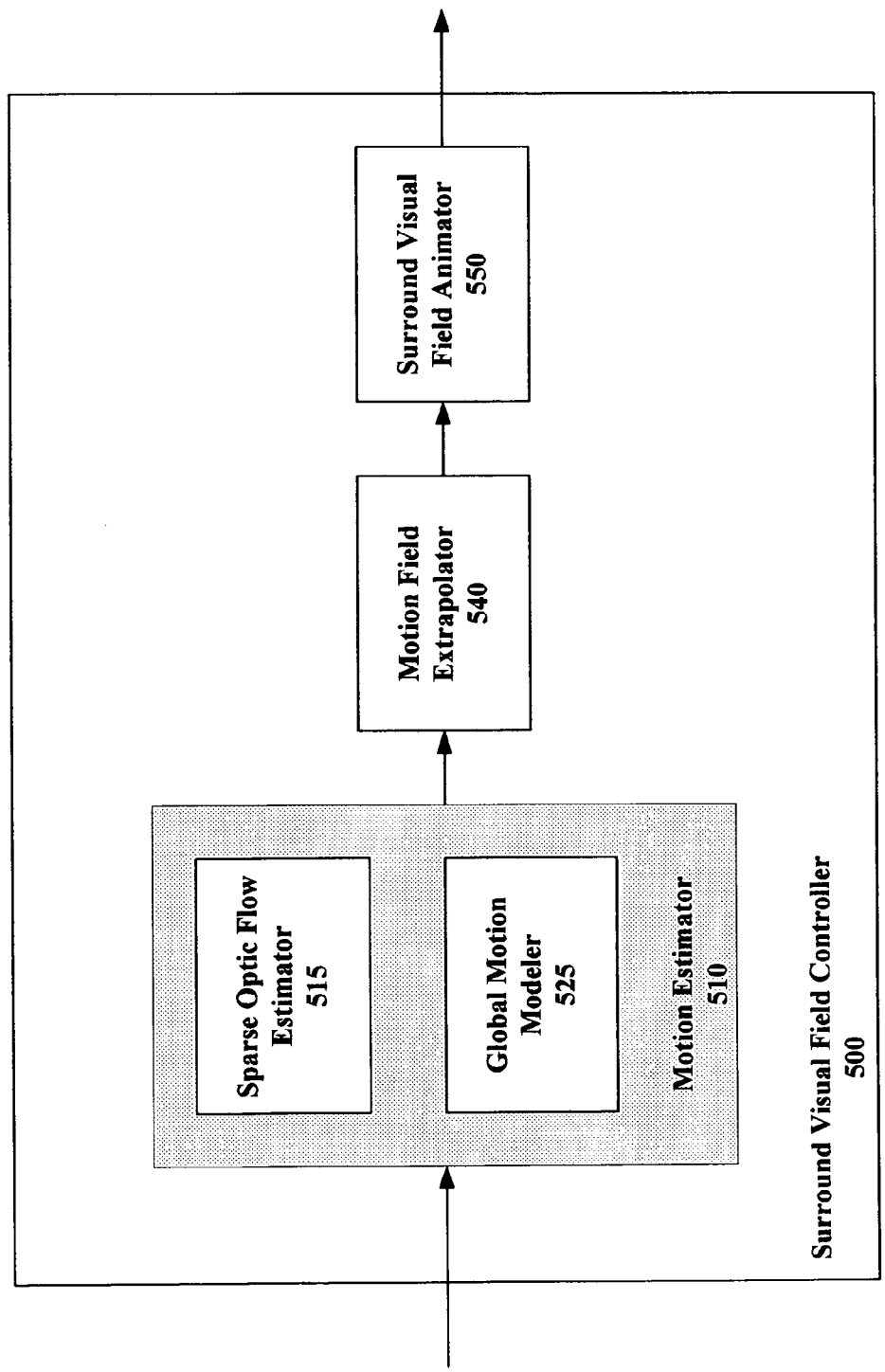
FIG. 5 is a block diagram of an exemplary surround visual field controller in which a projected surround visual field relates to motion within displayed content according to one embodiment of the invention.

FIG. 5 illustrates an exemplary surround visual field controller 500 in which motion within video content is used to generate a surround visual field according to one embodiment of the invention. The controller 500 may be integrated within a projection device, connected to a projection device, or otherwise enabled to control surround visual fields that are projected and displayed in a viewing area. In one embodiment, the controller 500 is provided a video signal that is subsequently processed in order to generate and control at least one surround visual field in relation to a video signal characteristic(s). For example, the controller 500 may render and control a surround visual field that relates to the movement within video content that is being displayed.

The controller 500 contains a motion estimator 510 that creates a model of global motion between successive video frame pairs, a motion field extrapolator 540 that extrapolates the global motion model beyond the boundaries of the video frame, and a surround visual field animator 550 that renders and controls the surround visual field, and elements therein, the extrapolated motion model. In one embodiment, the motion estimator 510 includes an optic flow estimator 515 to identify optic flow vectors between successive video frame pairs and a global motion modeler 525 that builds a global motion model using the identified optic flow vectors. Each component will be described in more detail below.

a) Motion Estimator

The motion estimator 510 analyzes motion between a video frame pair and creates a model from which motion between the frame pair may be estimated. The accuracy of the model may depend on a number of factors including the density of the optic flow vector field used to generate the model, the type of model used and the number of parameters within the model, and the amount and consistency of movement between the video frame pair. The embodiment below is described in relation to successive video frames; however, the present invention may estimate and extrapolate motion between any two or more frames within a video signal and use this extrapolated motion to control a surround visual field.

In one example, motion vectors that are encoded within a video signal may be extracted and used to identify motion trajectories between video frames. One skilled in the art will recognize that these motion vectors may be encoded and extracted from a video signal using various types of methods including those defined by various video encoding standards (e.g. MPEG, H.264, etc.). In another example that is described in more detail below, optic flow vectors may be identified that describe motion between video frames. Various other types of methods may also be used to identify motion within a video signal; all of which are intended to fall within the scope of the present invention.

b) Optic Flow Estimator

In one embodiment of the invention, the optic flow estimator 515 identifies a plurality of optic flow vectors between a successive pair frame. The vectors may be defined at various motion granularities including pixel-to-pixel vectors and block-to-block vectors. These vectors are used to create an optic flow vector field describing the motion between the frames.

The vectors may be identified using various techniques including correlation methods, extraction of encoded motion vectors, gradient-based detection methods of spatio-temporal movement, feature-based methods of motion detection and other methods that track motion between video frames.

Correlation methods of determining optical flow may include comparing portions of a first image with portions of a second image having similarity in brightness patterns. Correlation is typically used to assist in the matching of image features or to find image motion once features have been determined by alternative methods.

Motion vectors that were generated during the encoding of video frames may be used to determine optic flow. Typically, motion estimation procedures are performed during the encoding process to identify similar blocks of pixels and describe the movement of these blocks of pixels across multiple video frames. These blocks may be various sizes including a 16×16 macroblock, and sub-blocks therein. This motion information may be extracted and used to generate an optic flow vector field.

Gradient-based methods of determining optical flow use spatio-temporal partial derivatives to estimate the image flow at each point in the image. For example, spatio-temporal derivatives of an image brightness function may be used to identify the changes in brightness or pixel intensity, which may partially determine the optic flow of the image. Using gradient-based approaches to identifying optic flow may result in the observed optic flow deviating from the actual image flow in areas other than where image gradients are strong (e.g., edges). However, this deviation may still be tolerable in developing a global motion model for video frame pairs.

Feature-based methods of determining optical flow focus on computing and analyzing the optic flow at a small number of well-defined image features, such as edges, within a frame. For example, a set of well-defined features may be mapped and motion identified between two successive video frames. Other methods are known which may map features through a series of frames and define a motion path of a feature through a larger number of successive video frames.

Figure 6:
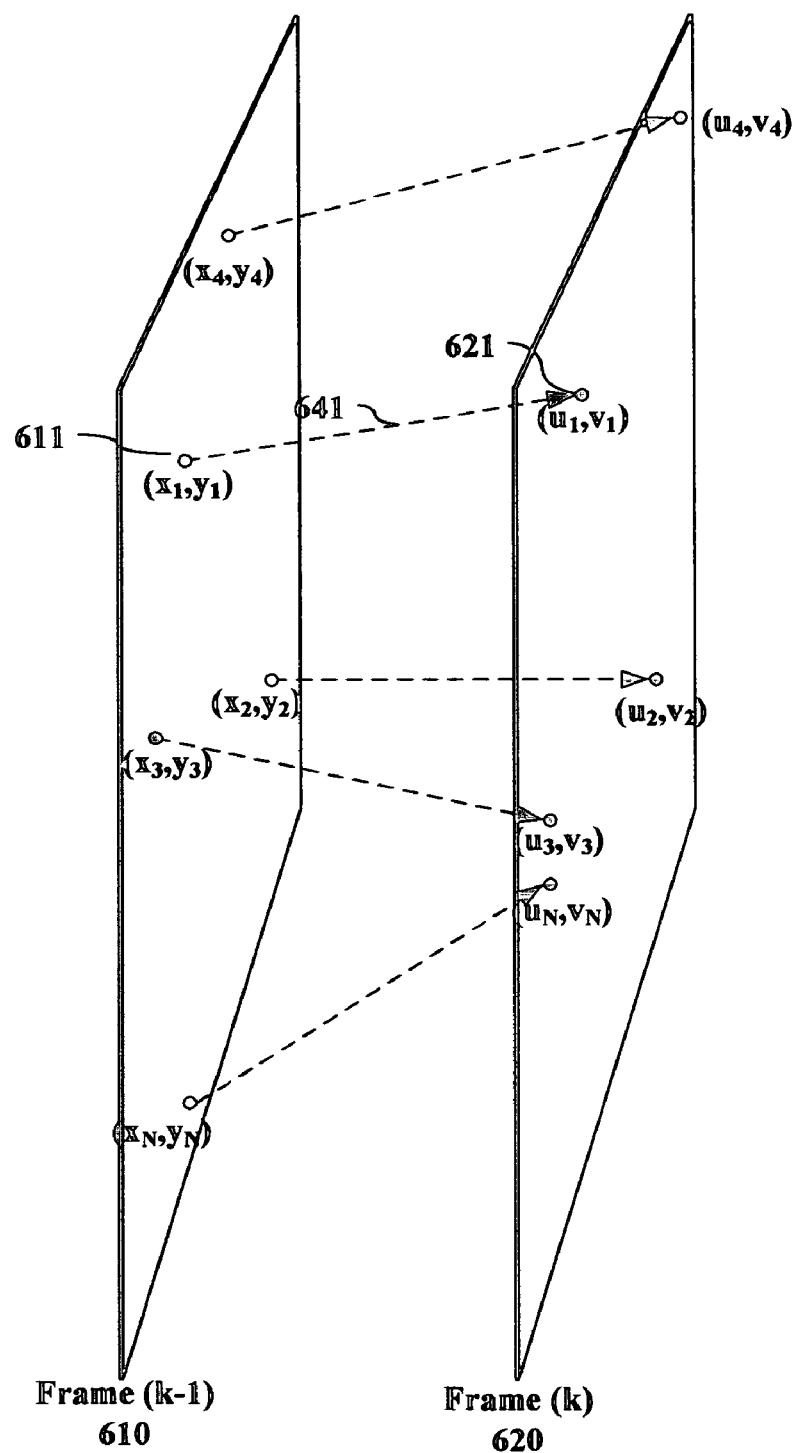
FIG. 6 is a diagram of a successive frame pair and exemplary optical flow vectors between the pixels within the frame pair according to one embodiment of the invention.

FIG. 6 illustrates exemplary optic flow vectors, at a pixel level, between successive video frames according to one embodiment of the invention. A first set of pixel points within a first frame, Frame (k−1) 610, are identified. This identification may be done based on motion identified within previous frames, motion vector information extracted from the encoding of the video frame 610, randomly generated, or otherwise identified so that a plurality of points are selected.

Vectors describing the two-dimensional movement of the pixel from its location in the first video frame 610 to its location in the second video frame 620 are identified. For example, the movement of a first pixel at location $(x_1, y_1)$ 611 may identified to its location in the second frame $(u_1, v_1)$ 621 by a motion vector 641. A field of optic flow vectors may include a variable number (N) of vectors that describe the motion of pixels between the first frame 610 and the second frame 620.

Figure 7:
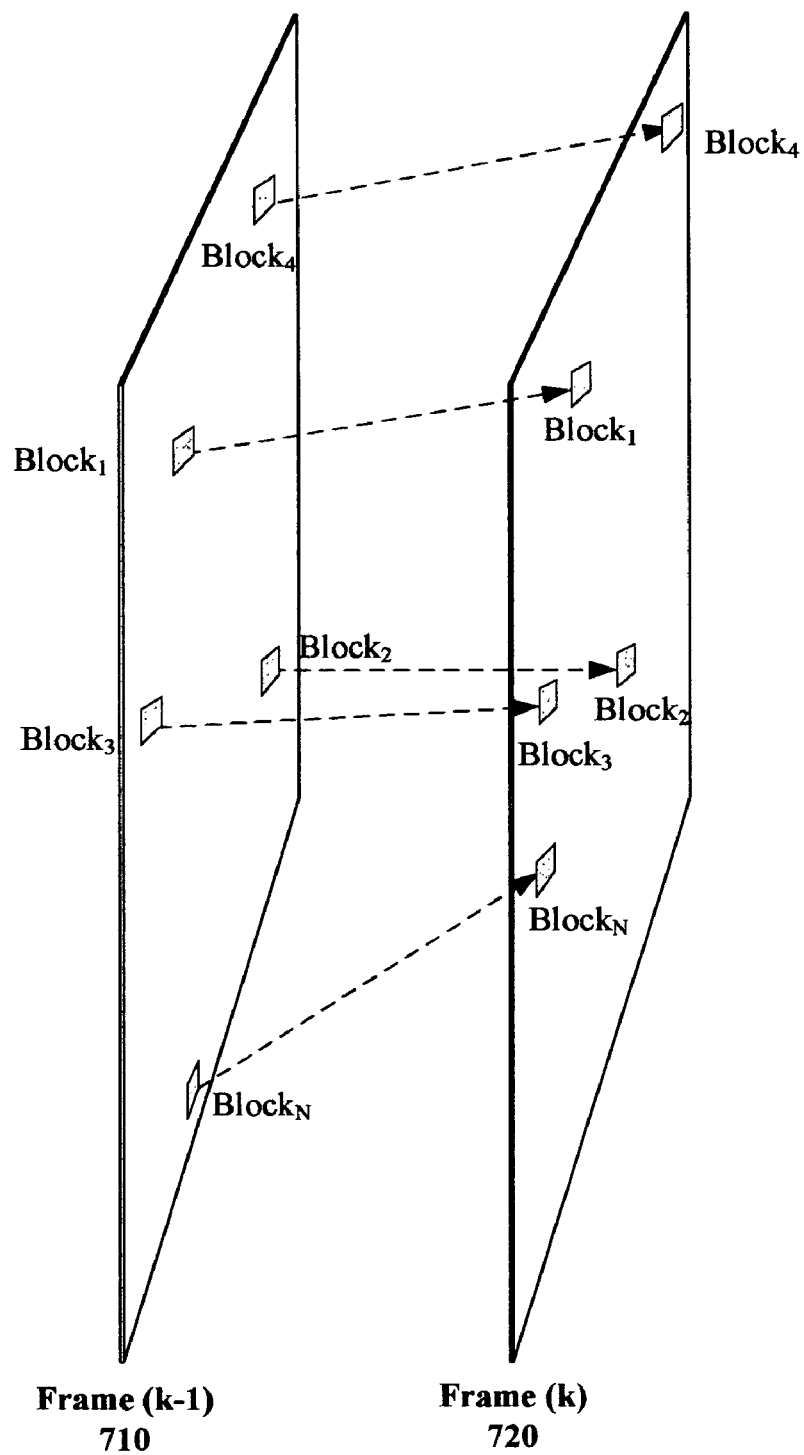
FIG. 7 is a diagram of a successive frame pair and exemplary optical flow vectors between pixel blocks within the frame pair according to one embodiment of the invention.

FIG. 7 illustrates successive video pair frames in which optic flow vectors between blocks are identified according to one embodiment of the invention. As mentioned above, optic flow vectors may also describe the movement of blocks of pixels, including macroblocks and sub-blocks therein, between a first frame, Frame (k−1) 710 and a second frame, Frame (k) 720. These vectors may be generated using the various techniques described above including being extracted from encoded video in which both motion and distortion between video blocks is provided so that the video may be reproduced on a display device. An optic flow vector field may then be generated using the extracted motion vectors. The optic flow vector field may also be generated by performing motion estimation wherein a block in the first frame 710 is identified in the second frame 720 by performing a search within the second frame for a similar block having the same or approximately the same pixel values. Once a block in each frame is identified, a motion vector describing the two-dimensional movement of the block may be generated.

c) Global Motion Modeler

The optic flow vector field may be used to generate a global model of motion occurring between a successive video frame pair. Using the identified optic flow vector field, the motion between the video frame pair may be modeled. Various models may be used to estimate the option flow between the video frame pair. Typically, the accuracy of the model depends on the number of parameters defined within the model and the characteristics of motion that they describe. For example, a three parameter model may describe displacement along two axes and an associated rotation angle. A four parameter model may describe displacement along two axes, a rotation angle and a scaling factor to describe motion within the frame.

In one embodiment of the invention, a six parameter model, called an "Affine Model," is used to model motion within the video frame. This particular model describes a displacement vector, a rotation angle, two scaling factors along the two axes, and the scaling factors' orientation angles. In general, this model is a composition of rotations, translations, dilations, and shears describing motion between the video frame pair.

The global motion modeler 525 receives the optic flow vector field information and generates a six parameter Affine Model estimating the global motion between the video frame pairs. From this model, motion between the frame pair may be estimated according to the following two equations:

$$u = a_1 + a_2 x + a_3 y$$

$$v = a_4 + a_5 x + a_6 y$$

where $a_1 \ldots a_6$ are parameters of the model.

In order to solve the six parameter, $a_1$ through $a_6$, a minimum of three optic flow vectors must have been previously defined. However, depending on the desired accuracy of the model, the optic flow vector field used to create the model may be denser in order to improve the robustness and accuracy of the model.

The global motion modeler 525 defines the model by optimizing the parameters relative to the provided optic flow vector field. For example, if N optic flow vectors and N corresponding pairs of points $(x_1, y_1) \ldots (x_N, y_N)$ and $(u_1, v_1) \ldots (u_N, v_N)$ are provided, then the parameters $a_1$ through $a_6$ may be solved according to an optimization calculation or procedure.

$$\begin{pmatrix} u_1 \\ \vdots \\ u_n \\ v_1 \\ \vdots \\ v_n \end{pmatrix} = \begin{pmatrix} 1 & x_1 & y_1 & 0 & 0 & 0 \\ & \vdots & & & \vdots & \\ 1 & x_n & y_n & 0 & 0 & 0 \\ 0 & 0 & 0 & 1 & x_1 & y_1 \\ & \vdots & & & \vdots & \\ 0 & 0 & 0 & 1 & x_n & y_n \end{pmatrix} \begin{pmatrix} a_1 \\ a_2 \\ a_3 \\ a_4 \\ a_5 \\ a_6 \end{pmatrix}$$

By optimizing the six parameters so that the smallest error between the model and the optic flow vector field is identified, a global motion model is generated. One method in which the parameters may be optimized is by least squared error fitting to each of the vectors in the optic flow vector field. The parameter values providing the lowest squared error between the optic flow vector field and corresponding modeled vectors are selected.

Figure 8:
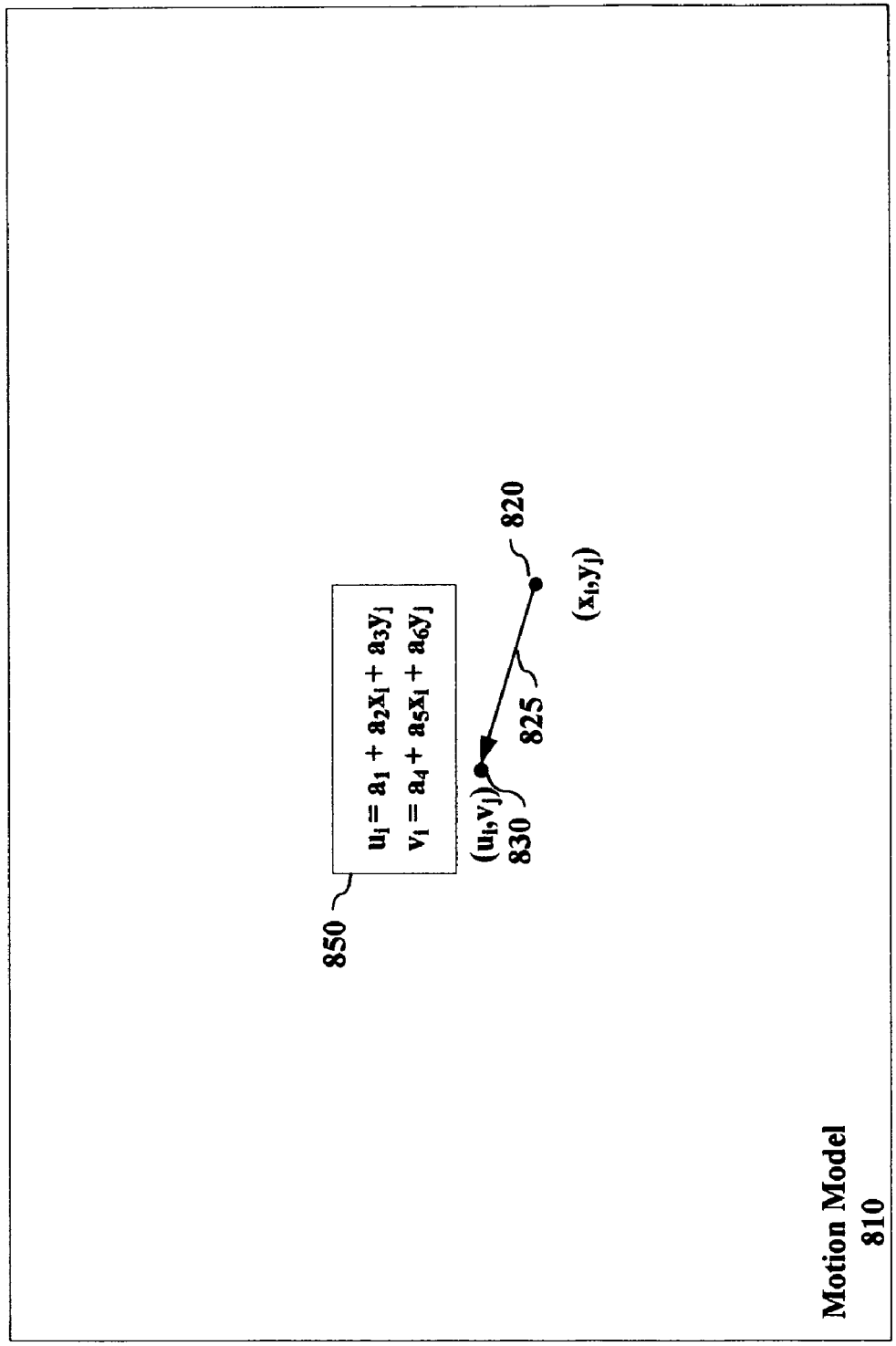
FIG. 8 is a diagram illustrating a mathematical relationship between two pixels within a global motion model representative of motion between a frame pair according to one embodiment of the invention.

FIG. 8 illustrates an example of how a motion vector, within the global motion model 810, may be generated according to one embodiment of the invention. In this example, the motion relative to $(x_j, y_j)$ 820 is identified by solving the equations 150 of the Affine Model to calculate $(u_j,$ $v_j$) 830. From these two points, a motion vector 825 may be calculated and used to grow the global motion model 810.

The described used of an Affine Model to generate the global motion model is not intended to exclude other types of models. For example, an eight parameter model that also describes three-dimensional rotation may also be used and may more accurately describe the motion within the video frame. However, the added parameters will require additional computations to construct and extrapolate the model. Accordingly, one skilled in the art will recognize that various models may be used depending on the desired accuracy of the global motion model and computational resources available to the system.

Figure 9:
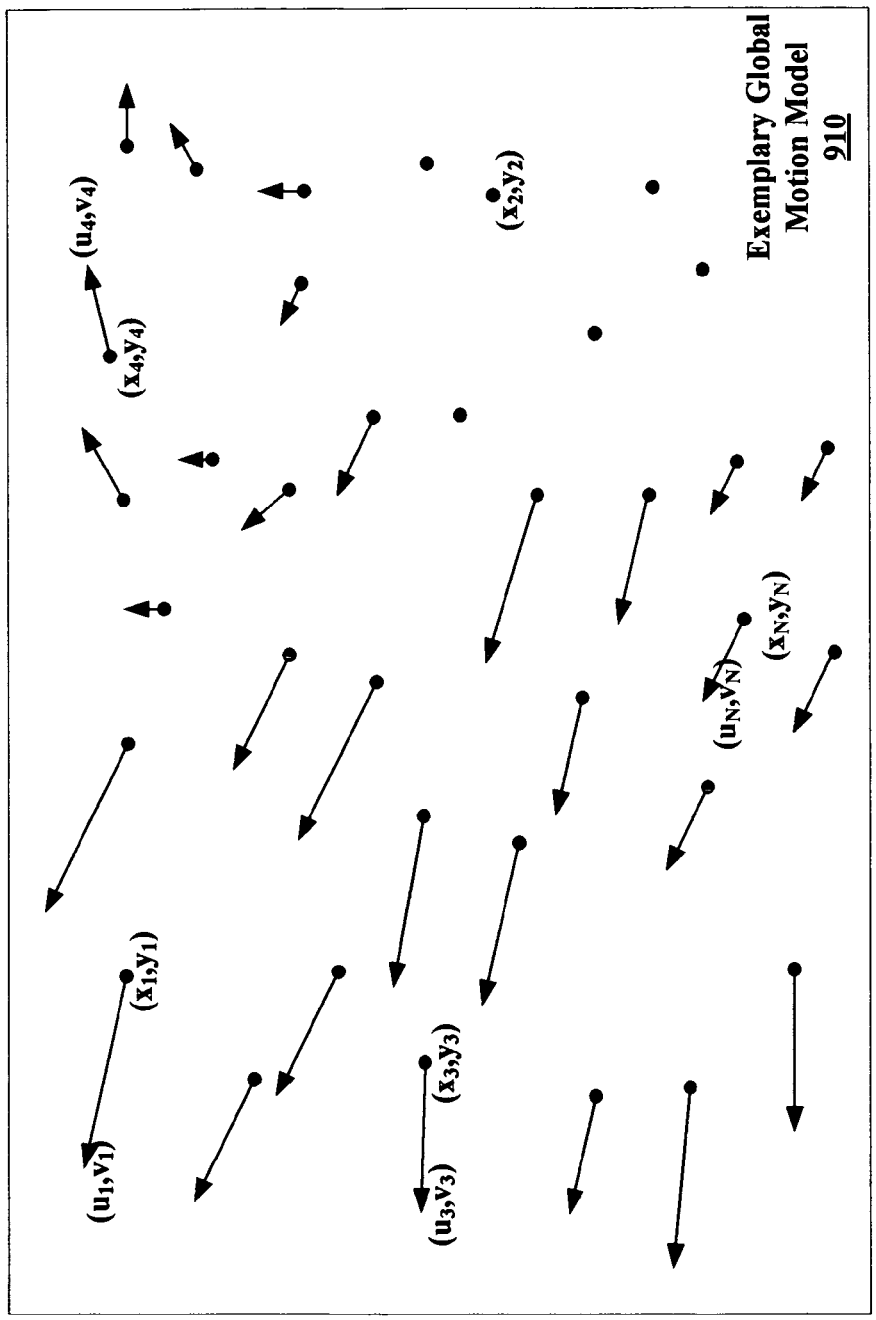
FIG. 9 is an illustrative representation of a calculated global motion model of motion between a frame pair according to one embodiment of the invention.

FIG. 9 illustrates an exemplary global motion model 910 between a video frame pair according to one embodiment of the invention. The illustration shows a plurality of motion vectors within the model, including four vectors estimating the movement associated with the four optic flow vectors shown in previous figures.

Figure 10A:
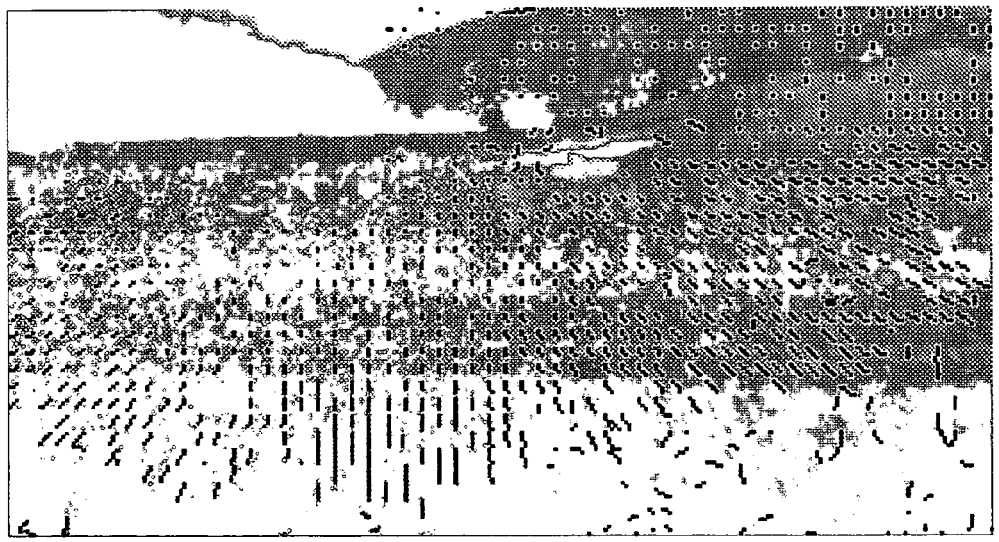
FIG. 10A is an example of a video frame and overlaid optical flow vectors according to one embodiment of the invention.
Figure 10B:
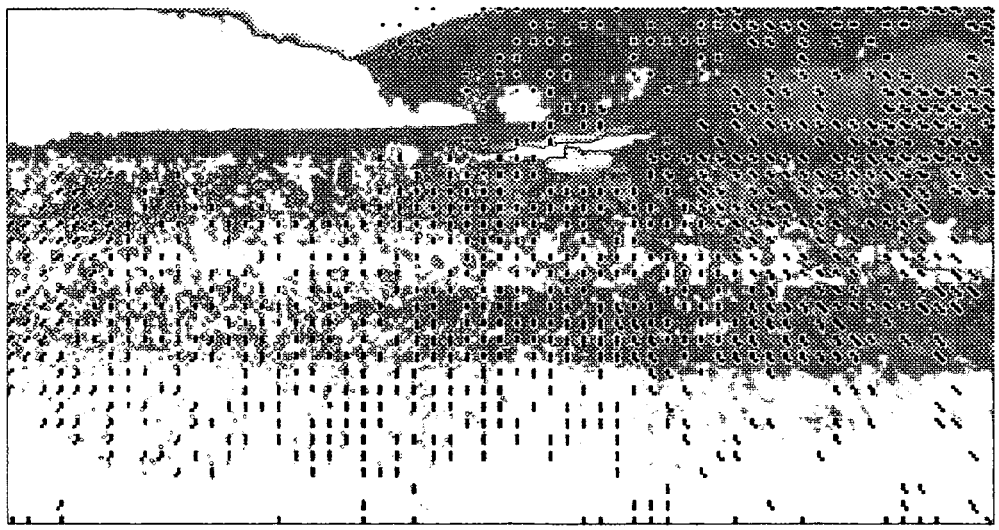
FIG. 10B is an example of the video frame and overlaid global motion model according to one embodiment of the invention.

FIG. 10A shows a representative optic flow vector field 1010 overlaid on a video frame and FIG. 10B shows a global motion model 1030, generated from the representative vector field, overlaid on the same video frame. Upon review, one skilled in the art will recognize that the global motion model may be used to extrapolate modeled motion within the video frame beyond the video frame boundaries.

d) Motion Field Extrapolator

The motion field extrapolator 540 extends the global motion model beyond the boundaries of the video frame to allow elements within the surround visual field beyond these frame boundaries to respond to motion within the frame. In one embodiment of the invention, the Affine Model equations defining motion vectors at $(x_N, y_N)$ to $(u_N, v_N)$ are used to expand the estimated motion beyond the boundaries of the frame, in which $(x_N, y_N)$ are located beyond the boundaries of the video frame.

Figure 11:
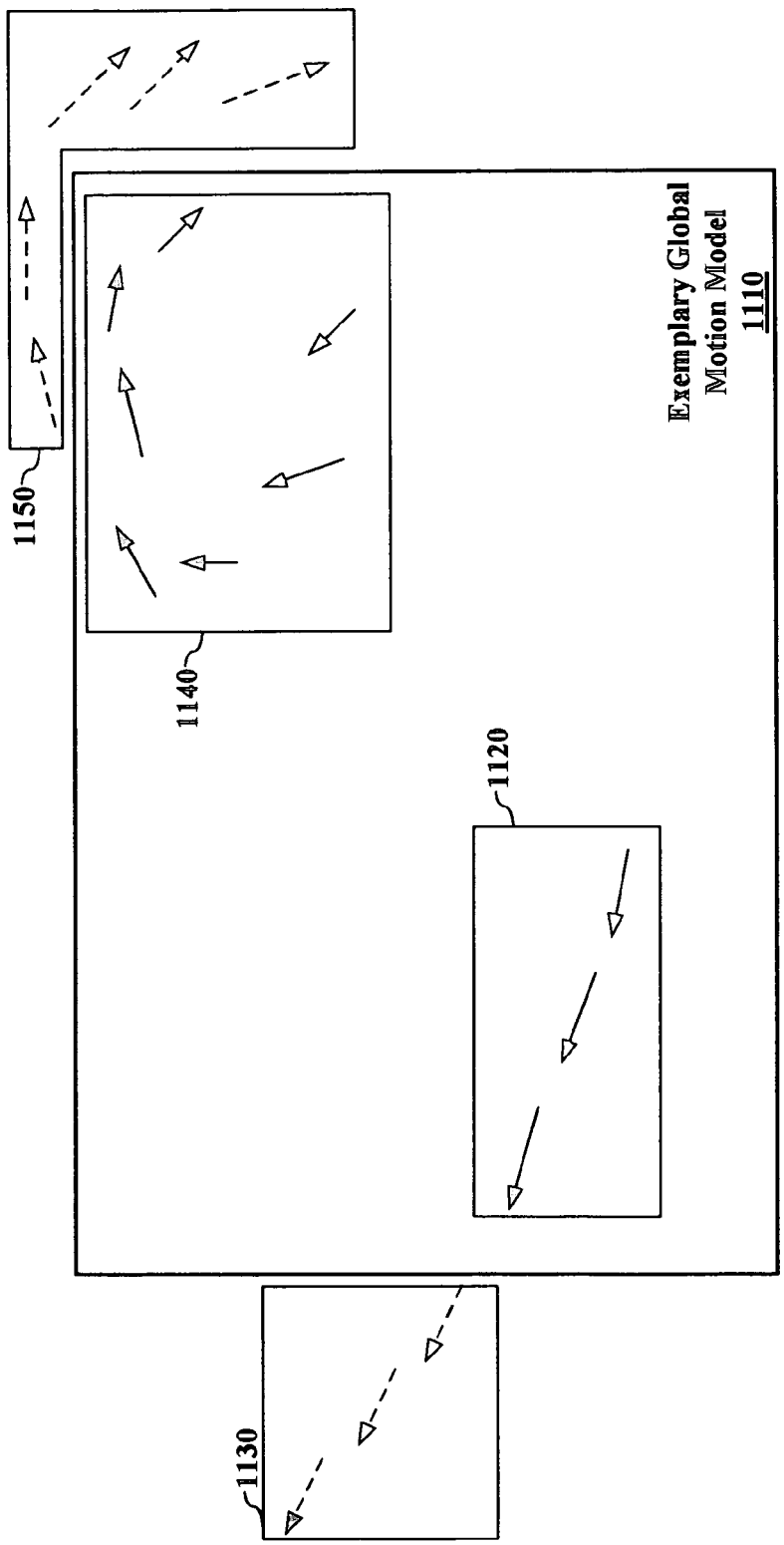
FIG. 11 is an illustration showing the extrapolation of motion vectors outside a video frame according to one embodiment of the invention.

FIG. 11 illustrates exemplary motion extrapolation that may be performed according to one embodiment of the invention. A first set of motion vectors 1120 having motion that is moving up at a slight angle and towards the left boundary is shown. This motion may be extrapolated beyond the boundaries of the frame by using the global motion model. Accordingly, a second set of motion vectors 1130 beyond the video frame boundaries may be generated. In another example, a third set of motion vectors 1140 having a clockwise rotation is shown. This rotational motion may also be extrapolated beyond the video frame by using the global motion model resulting in a fourth set of motion vectors 1150 outside of the frame boundaries being generated.

These motion vectors (e.g., 1130, 1150) may be used to define the movement of the surround visual field, and/or element therein, that is projected around the display of the video frame. As the motion within the frame changes, the global motion model will respond resulting in the surround visual field changing. In one embodiment of the invention, the elements within the surround visual field subsequently respond and are controlled by the motion vectors that were extrapolated using the global motion model.

Figure 12:
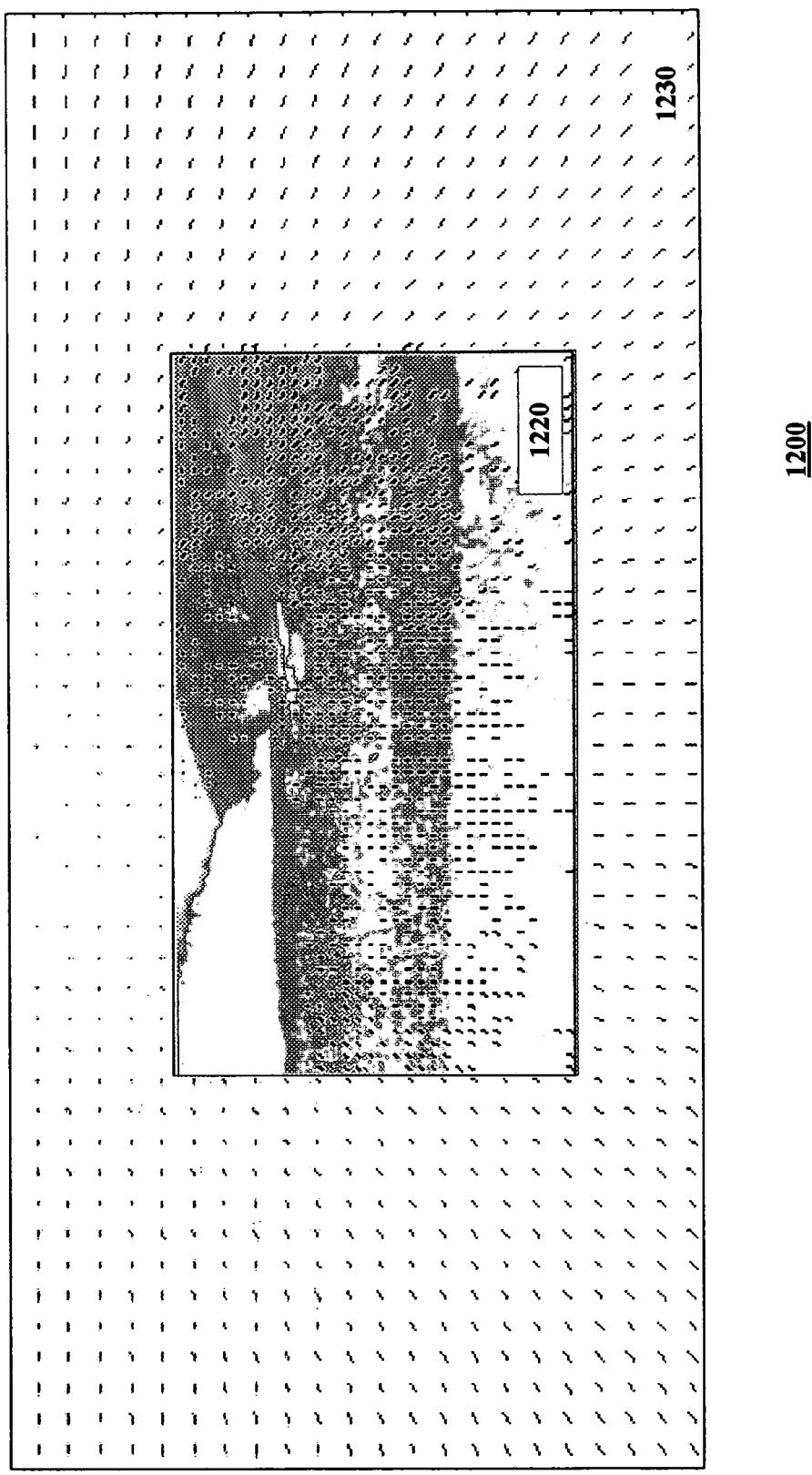
FIG. 12 is an example of a video frame, an overlaid global motion model on the video frame, and an extrapolated global motion model beyond the boundaries of the video frame according to one embodiment of the invention.

FIG. 12 illustrates an exemplary extrapolated global motion model that may be used to control the movement of a surround visual field, and elements therein, around a displayed video frame according to one embodiment of the invention. The vectors defined by the global motion model 1220 within the frame are shown and estimate the movement within the frame itself. This model is expanded beyond the boundaries of the frame to provide an extrapolated global motion model 1230. The vectors within the extrapolated global motion model 1230 may control the movement of elements within the surround visual field.

The surround visual field may also be projected onto a device displaying the video frame. In such an instance, the movement of the elements within the surround visual field on the device is controlled by the vectors within global motion model 1220 that estimate movement in the video frame.

e) Surround Visual Field Animator

The surround visual field animator 550 creates, animates and maintains the projected surround visual field according to at least one characteristic of the video content. In one embodiment, as described above, the elements within the surround visual field move in relation to motion within the video being displayed.

The surround visual field may be generated and maintained using various techniques. In one embodiment of the invention, elements within the surround visual field are randomly generated within the field and fade out over time. Additional elements are randomly inserted into the surround visual field to replace the elements that have faded out. These additional elements will also decay and fade out over time. The decay of elements and random replacement of elements within the surround visual field reduces the bunching or grouping of the elements within the surround visual field which may be caused by their movement over time.

(i) Surround Visual Field Element Shapes

Figure 13:
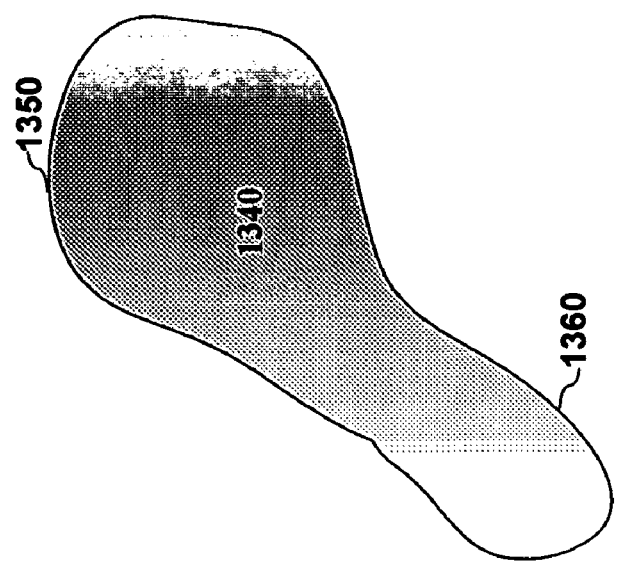
FIG. 13 illustrates an exemplary modified surround visual field element relative to motion according to one embodiment of the invention.
Figure 13:
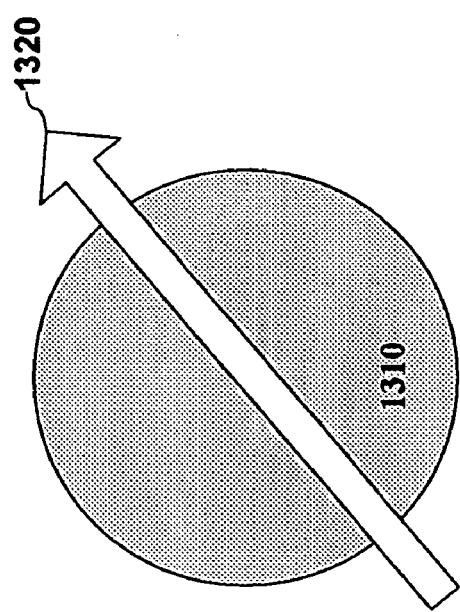

In addition to the movement, other characteristics of the surround visual field, including elements therein, may be controlled by an extrapolated global motion model. For example, the shape of each of the elements within the field may be determined by vectors within the global motion model. FIG. 13 illustrates one method in which the shape of an element relates to a corresponding motion vector.

In one embodiment of the invention, the shape of an element 1310 is affected by a motion vector 1320 corresponding to the location of the element 1310 relative to the global motion model. For example, the element 1310 may be expanded along an axis of a corresponding motion vector 1320 and weighting provided in the direction of the motion vector 1320. In the example illustrated in FIG. 13, the re-shaped element 1340 is stretched along a motion axis resulting in a narrower tail 1360 and a wider head 1350 pointing toward the direction of the motion vector 1320.

Other characteristics of the re-shaped element 1340 may also be modified to reflect the motion vector 1320. For example, the intensity at the head of the re-shaped element 1340 may be bright and then taper as it approaches the tail 1360 of the element 1340. This tapering of intensity relative to motion may enhance the perceived motion blur of the element as it moves within the surround visual field.

Figure 14:
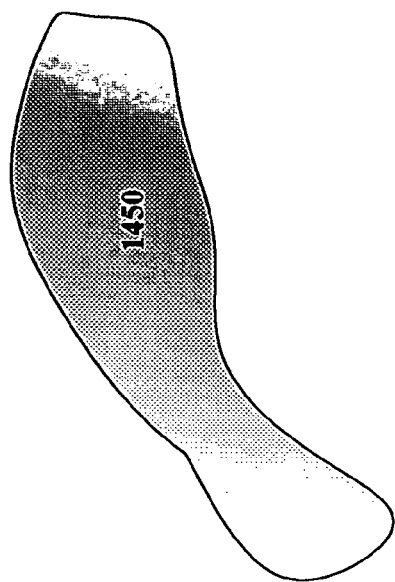
FIG. 14 illustrates an exemplary modified surround visual field element relative to multiple motion vectors according to one embodiment of the invention.
Figure 14:
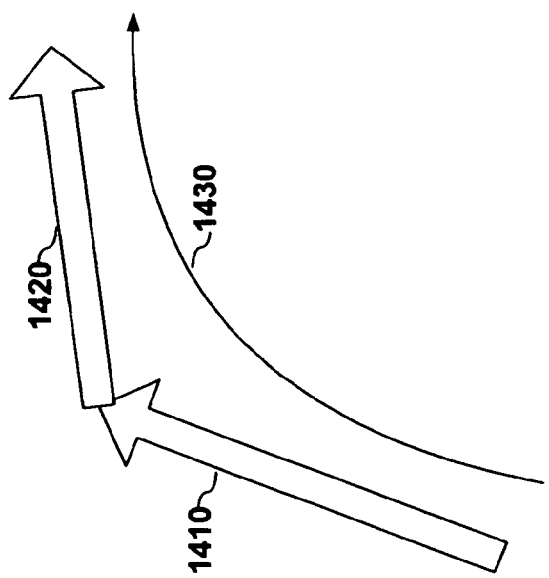

In yet another embodiment, the shape of an element may correspond to motion of sequential motion vectors relating to the element itself. FIG. 14 illustrates one method in which the element's shape and movement may be defined according to multiple motion vectors within the global motion model that occur over time. In this embodiment, an element moves relative to two sequential motion vectors 1410, 1420 that were modeled from two video frame pairs. The path defined by the two vectors 1410, 1420 contains a sharp turn at the end of the first vector 1410 and the beginning of the second vector 1420. This turn may diminish the viewing quality of the motion of an element following the path and may appear to cause the element to jerk in its motion.

The path may be smoothed into a curved path 1430 that does not contain any sudden motion changes. This smoothing may be performed by various mathematical equations and models. For example, a re-shaped element 1450 may reflect the curved path in which the element 1450 is elongated along the curve 1430. The intensity of the re-shaped element 1450 may vary to further enhance the motion appearance by having the intensity be the brightest near the head of the point and gradually tapering the brightness approaching the tail.

One skilled in the art will recognize that there are other methods in which the shape of a element may be modified to accentuate the motion of the surround visual field.

Figure 15:
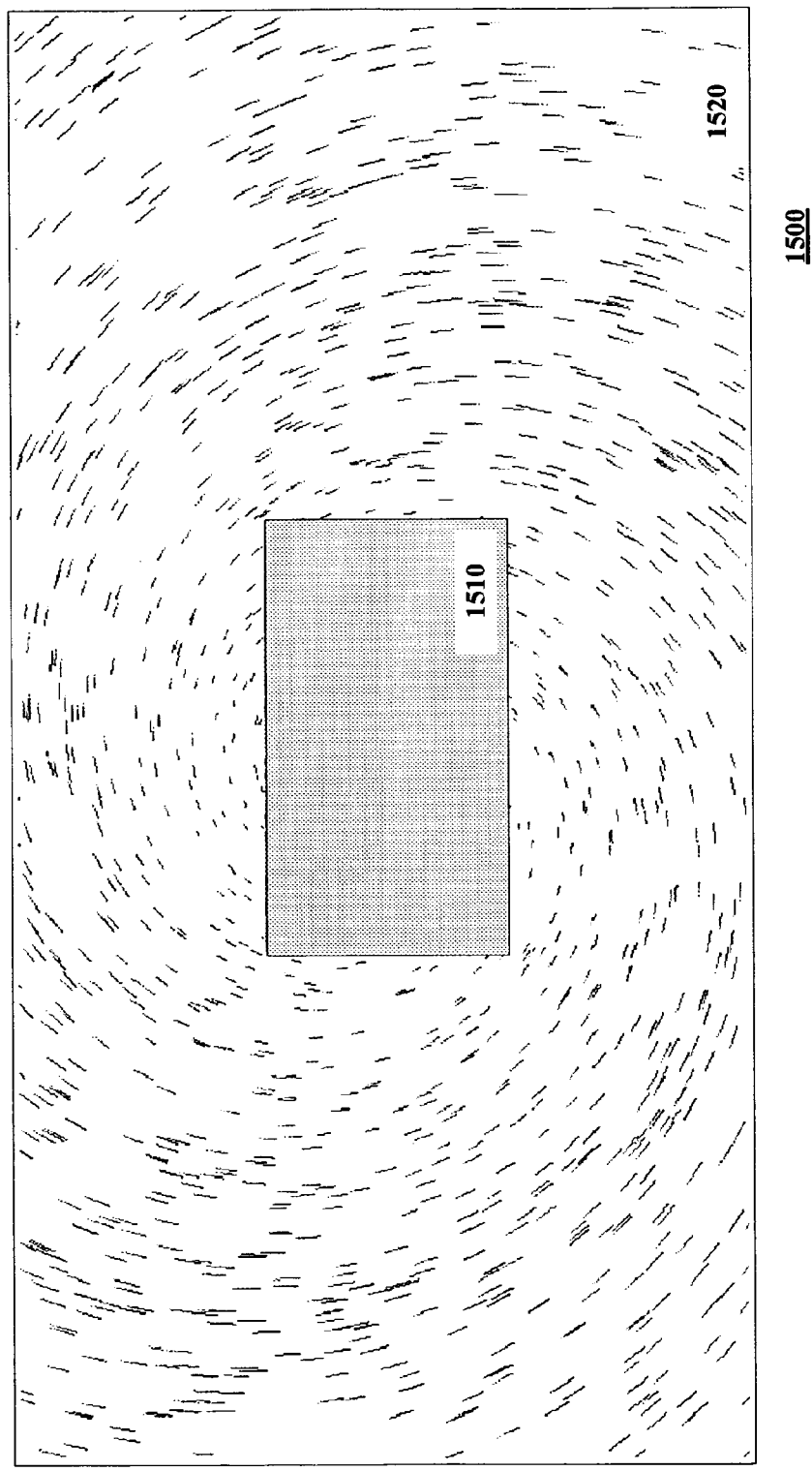
FIG. 15 is an illustration of an exemplary surround visual field related to motion within a video according to one embodiment of the invention.

FIG. 15 is an illustrative example of a video presentation including surround visual field according to one embodiment of the invention. In this example, video is being shown a screen 1510 in which counter-clockwise motion is dominant in the frame. This dominant motion is modeled, extrapolated and used to animate a surround visual field 1520. In this particular example, the surround visual field 1520 also is rotating in a counter-clockwise manner; thereby enhancing the motion within the screen 1510. This surround visual field greatly expands the area in which motion is displayed to an individual and may increase the immersive effects of the video itself.

While the present invention has been described with reference to certain exemplary embodiments, those skilled in the art will recognize that various modifications may be provided. Accordingly, the scope of the invention is to be limited only by the following claims.

We claim:

1. A system for displaying primary video content within a primary display area, and for generating secondary video content from said primary video content, said system comprising:
    an input for receiving a video signal conveying said primary video content;
    a first computing processing block for extracting motion vectors from said video signal, said motion vectors identifying motion between successive video frames of said primary video content, said motion vectors including rotation angle information describing rotation motion of at least a first portion of a current frame of said primary video content;
    a second computing processing block for generating secondary video content not found within said video signal, said secondary video content including an extrapolation of said rotation motion of said first portion of a current frame and; and
    a display means for displaying said primary video content within said primary display area and displaying said generated secondary video content;
    wherein said display means is a single display device simultaneously displaying said primary video content and said generated secondary video content;
    said secondary video content includes generation of a highlighting image that highlights video content within said primary display area; and
    said display device displays said highlighting image within said primary display area.

2. The system of claim 1, wherein said secondary video content includes generation of a highlighting image tracking the motion of an object within said primary display area; and
    said display device displays said highlighting image on said object within said primary display area.

3. The system of claim 1, wherein said motion vectors are extracted from a displacement model describing rotation, translation, dilation, and shear motion between said successive video frames of said primary video content.

4. The system of claim 3, wherein said displacement model includes a displacement vector, a rotation angle, two scaling factors along two axes, and the scaling factor's orientation angles.

5. The system of claim 1, wherein said video signal is part of a video/audio signal including a multi-channel audio signal, and wherein at least a portion of the generating of said secondary video content is responsive to a specific one channel of said multi-channel audio signal.

6. The system of claim 1, wherein:
    said display means displays said primary video content within said primary display area, and displays said secondary video content within said secondary display area; and
    said extrapolation of said rotation motion extrapolates rotation motion for said secondary video content.

7. A system for displaying primary video content within a primary display area, and for generating secondary video content from said primary video content, said system comprising:
    an input for receiving a video signal conveying said primary video content;
    a first computing processing block for extracting motion vectors from said video signal, said motion vectors identifying motion between successive video frames of said primary video content, said motion vectors including rotation angle information describing rotation motion of at least a first portion of a current frame of said primary video content;
    a second computing processing block for generating secondary video content not found within said video signal, said secondary video content including an extrapolation of said rotation motion of said first portion of a current frame and; and
    a display means for displaying said primary video content within said primary display area and displaying said generated secondary video content;
    wherein said extrapolation of said rotation motion extends beyond said current frame and is not representative of video content within the received video signal; and
    said extrapolation of said rotation motion is displayed in a secondary display area that at least partially surrounds said primary display area.

8. The system of claim 7, wherein said extrapolation of said rotation motion is represented by a new set of motion vectors outside said primary display area.

9. The system of claim 8, wherein said rotational motion of said at least first portion of said current frame of said primary video content is indicative of a clockwise rotational motion, and said new set of motion vectors indicate a clockwise rotational motion outside said primary display area.

10. The system of claim 8, wherein the shape of objects within said secondary display area are distorted and elongated in the rotational direction indicated by said new set of motion vectors.

11. The system of claim 7, wherein:
    the received video signal is a compressed digital video signal, and said first processing block decompresses said compressed digital video signal;
    the extracted motion vectors identify a global motion between successive video frames of said primary video content;
    said display means displays said primary video content within said primary display area, and displays said secondary video content within said secondary display area.

12. The system of claim 11, further including an environmental sensor for detecting a location of a human viewer of said primary display area; wherein
- said secondary video content creates a center of vision within said secondary display area, and said center of vision is adjusted to coincide with a currently detected location of said human viewer; and
- said display means displays said primary video content within said primary display area and displays the generated secondary video content having the adjusted center of vision to coincide with the currently detected location of said human viewer in said within said secondary display area.

13. The system of claim 7, wherein said second processing block tracks the motion of a scene within said primary display area, and as part of said scene passes out of view of said primary display area, the part that passes out of view is regenerated and continued within said secondary display area.

14. A system for displaying primary video content within a primary display area, and for generating secondary video content from said primary video content, said system comprising:
- an input for receiving a video signal conveying said primary video content;
- a first computing processing block for extracting motion vectors from said video signal, said motion vectors identifying motion between successive video frames of said primary video content, said motion vectors including rotation angle information describing rotation motion of at least a first portion of a current frame of said primary video content;
- a second computing processing block for generating secondary video content not found within said video signal, said secondary video content including an extrapolation of said rotation motion of said first portion of a current frame and; and
- a display means for displaying said primary video content within said primary display area and displaying said generated secondary video content:
- wherein the received video signal is a compressed video signal, and said first computing processing block extracts motion vectors from the compression information of said compressed video signal.

15. A system for displaying primary video content within a primary display area, and for generating secondary video content from said primary video content, said system comprising:
- an input for receiving a video signal conveying said primary video content;
- a first computing processing block for extracting motion vectors from said video signal, said motion vectors identifying motion between successive video frames of said primary video content, said motion vectors including rotation angle information describing rotation motion of at least a first portion of a current frame of said primary video content;
- a second computing processing block for generating secondary video content not found within said video signal, said secondary video content including an extrapolation of said rotation motion of said first portion of a current frame and; and
- a display means for displaying said primary video content within said primary display area and displaying said generated secondary video content:
- wherein the received video signal is an encoded digital video signal, and said first computing processing block extracts motion vectors the encoded information of said encoded digital video signal.

16. A system for displaying primary video content within a primary display area, and for generating secondary video content from said primary video content, said system comprising:
- an input for receiving a video signal conveying said primary video content;
- a first computing processing block for extracting motion vectors from said video signal, said motion vectors identifying motion between successive video frames of said primary video content, said motion vectors including rotation angle information describing rotation motion of at least a first portion of a current frame of said primary video content;
- a second computing processing block for generating secondary video content not found within said video signal, said secondary video content including an extrapolation of said rotation motion of said first portion of a current frame and; and
- a display means for displaying said primary video content within said primary display area and displaying said generated secondary video content:
- wherein the extracted motion vectors identify a global frame motion between successive video frames of said primary video content.

17. The system of claim 16, wherein said global frame motion is a vector field across a frame.

18. The system of claim 16, wherein said display means is a single display device.

19. The system of claim 18, wherein said single display device is a single projector.

* * * * *